W. W. TREVOR.
Machine for Cutting Key-Seats.
No. 221,480. Patented Nov. 11, 1879.
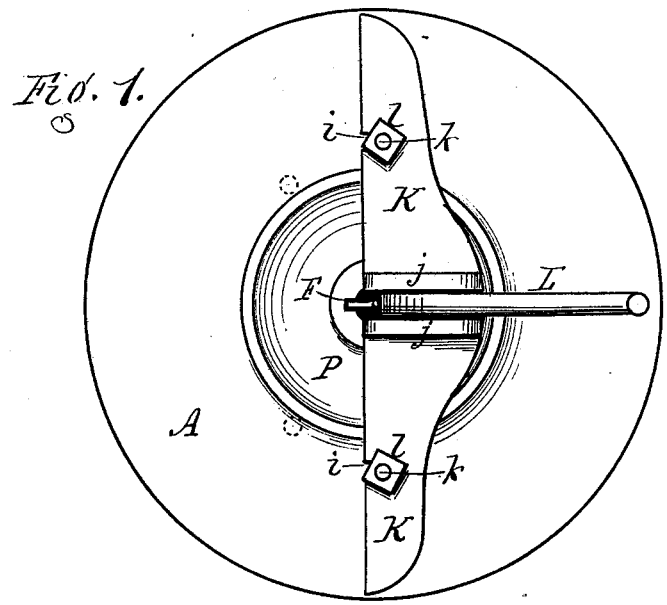
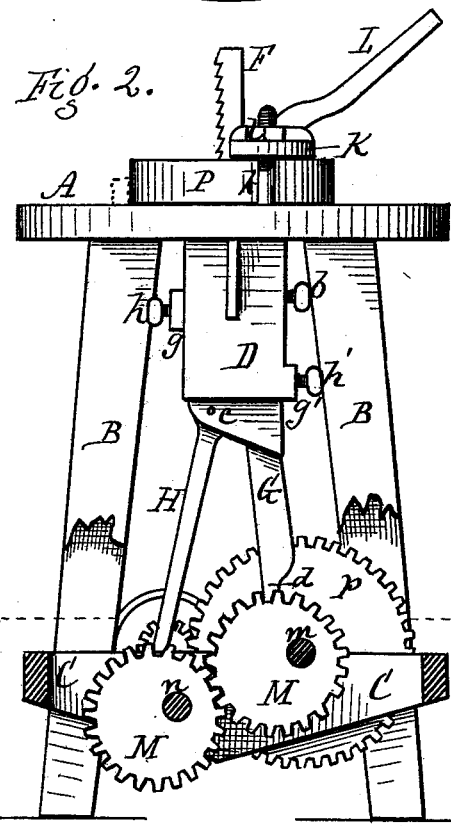

W. W. TREVOR.
Machine for Cutting Key-Seats.
No. 221,480. Patented Nov. 11, 1879.
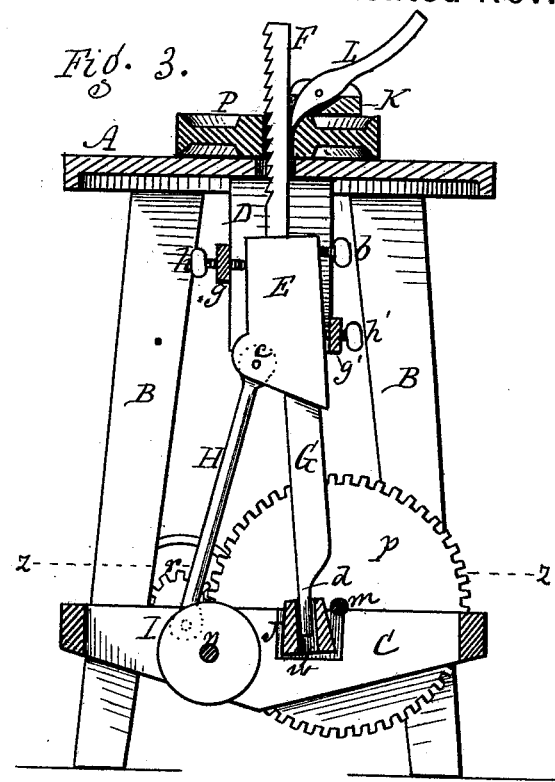
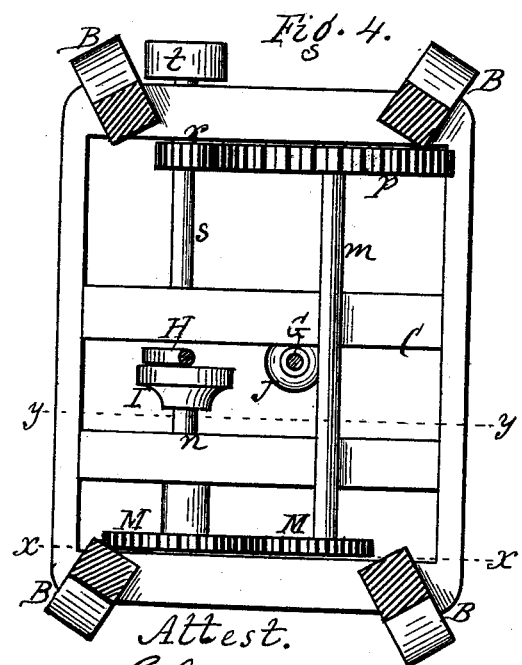
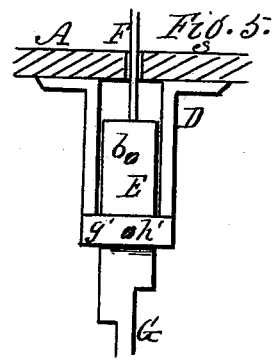
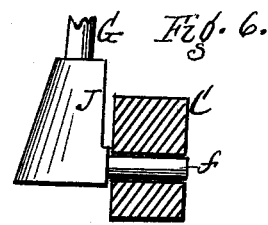

UNITED STATES PATENT OFFICE.

WILLIAM W. TREVOR, OF LOCKPORT, NEW YORK.

IMPROVEMENT IN MACHINES FOR CUTTING KEY-SEATS.

Specification forming part of Letters Patent No. 221,480, dated November 11, 1879; application filed June 28, 1879.

*To all whom it may concern:*

Be it known that I, WILLIAM W. TREVOR, of Lockport, Niagara county, New York, have invented a certain new and useful Improvement in Machines for Cutting Key-Seats in Wheels and Pulleys; and I do hereby declare that the following is a full, clear, and exact description of the same, reference being had to the accompanying drawings, in which—

Figure 1 is a plan of the machine. Fig. 2 is a side elevation, partially in section, the line of section being indicated by line $xx$, Fig. 4. Fig. 3 is a vertical section in line $yy$, Fig. 4. Fig. 4 is a horizontal section in line $zz$, Figs. 2 and 3. Figs. 5 and 6 are detail views.

My improvement relates to key seating or slotting machines, and is designed to do the work in a simpler and more effective manner than in ordinary machines for the purpose.

The invention consists in the construction and arrangement of parts hereinafter more fully described.

In the drawings, A is a circular table, mounted on legs B B, and C is a frame near its bottom, which sustains the working parts.

D is a hanger forming a way, consisting of two sides or arms projecting downward from the table.

E is a block which rests within the way, and is free to be moved up and down and forward and backward.

F is a cutter attached to the block, and projecting up through a slot in the table. It is similar in shape to a saw-blade, being toothed on its front and smooth on its back. The cutter is made fast to the sliding block by a set-screw, $b$, or other suitable means.

G is a stiff guide-bar attached to the bottom of the sliding block E, and H is a pitman, jointed at $c$ to said block. The lower end of the pitman is correspondingly pivoted to a crank-wheel, I, and the latter, as it revolves, gives a vertical reciprocating motion to the sliding block E, and consequently to the cutter F. The guide-bar G extends downward, and has at its bottom a cylindrical journal end, $d$, which rests and slides in a box, J. This box has a lateral or right-angled axis, $f$, which rests and turns in a socket in one of the cross-pieces of the frame C. The socket $w$, in which the journal $d$ of the bar rests, allows the bar a free up-and-down motion, while the axis $f$, upon which the box turns, allows the bar a free forward-and-back motion, which is essential in the cutting of the key-slot, as hereinafter described. A free motion is thus allowed the bar in all positions of the stroke; but the bar, being confined in the box, controls and regulates the movement of the sliding block and cutter.

$g\ g'$ are cross-pieces attached on the front and back sides of the way D, through which pass, respectively, adjusting-screws $h\ h'$, forming gages to the sliding block. The front screw, $h$, is for regulating the depth to which the key seats or slots are cut in the wheel or pulley. This is done by turning it out or in. In the down movement the sliding block strikes it, and the cutter can cut no deeper than the gage allows. It is especially useful where it is desired to cut a large number of slots to a given depth. The wheel or pulley which is being acted upon rests against fixed stops on top of the table. (Shown in dotted lines, Fig. 1.)

The screw $h'$, on the back side, is to gage the movement of the sliding block in the upstroke, allowing the teeth of the cutter to move free in the slot, but preventing the back of the cutter from striking the back of the slot in the table when the pitman stands at quite an angle to the block.

The two screws are adjusted relatively to one another so as to give freedom of motion to the sliding block, but still keep it within proper bounds. As much or more freedom is allowed between them as equals the depth of the slot to be cut.

K is a cross-bar resting across the table and upon the wheel or pulley P, holding the latter in place. It has open notches or slots $i\ i$, which fit around screw-shanks $k\ k$, rising from the table, and the cross-bar is held down by nuts $l\ l$, which screw upon the bolts $k\ k$. By this means the cross-bar may be adjusted forward and back, and be tightened in any position, and may be removed and replaced at pleasure.

L is a hand-lever, which is pivoted between lugs $j\ j$ of the cross-bar, and has a pointed or cam-shaped lower end, which projects down and rests against the back of the cutter. The handle extends up and rests in convenient position for the hand of the operator.

In the upstroke of the cutter the lever is thrown up, which allows the cutter to free itself of contact with its work. In the down-stroke the operator exerts pressure upon the lever, which causes the cutter to engage with its work. The action of the cutter is therefore directly under the control of the operator.

M M are a pair of eccentric gears situated on the shafts $m$ $n$, the latter shaft carrying the crank-wheel I. These gears are so arranged, the long side of one gearing into the short side of the other, that in the down movement the cutter moves slowly to do its work, and in the upstroke it moves rapidly to take a new hold. By this means greater rapidity of execution is produced, as there is little loss of time in the upstroke.

At the opposite end of shaft $m$ is a spur-wheel, $p$, which engages with a pinion, $r$, on a short shaft, $s$, at the outer end of which is a pulley, $t$, by which power is applied to the machine.

In ordinary machines of this class, where the cutter is pivoted in a sliding frame which always moves in the same plane, the action is such as to cut the bottom of the key-slot of rounding or convex form, so that the key which fits therein cannot be properly seated nor be properly driven in place.

By making the cutter fast to the sliding block E and employing the guide-bar G, resting in pivoted box J, the cutter moves down in a straight line at all times, avoiding the rocking motion of the cutter, and consequently cutting a straight slot instead of a rounding one.

The cutter moves up and down in a slightly-inclined direction in order to give the proper taper to the seat for the fitting of the wedge-shaped key; and the long guide-bar G is found essential to keep the cutter in position at such incline, ordinary sliding heads not being found sufficient for the purpose.

A similar result might be attained by pivoting the frame in which the ordinary sliding head rests, thereby securing a movement of sliding head and cutter at all times in the same plane. The cutter must be fast to the sliding head to accomplish the result.

Having thus described my invention, I claim—

1. In a key seating or slotting machine, the combination of the fixed cutter F, the sliding head E, the adjusting-screws $h$ $h'$, the stiff bar G, attached to the sliding head, and the pivoted box J, provided with a socket which receives the lower end of the bar, as shown and described, and for the purpose specified.

2. In a key seating or slotting machine, the combination of the fixed cutter F, the sliding head E, the adjusting-screws $h$ $h'$, the stiff bar G, the pivoted box J, the pitman H, crank-wheel I, and eccentric gears M M, as shown and described, and for the purpose specified.

3. In a key seating or slotting machine, the combination, with the sliding head E, guide-bar G, and pivoted box J, of the adjusting-screw $h$, resting in a bearing, $g$, and serving to gage the movement of the sliding head in cutting the slot, and the lever L, for pressing the cutter forward to its work, as herein shown and described.

4. In a key seating or slotting machine, the combination, with the sliding head E, guide-bar G, and pivoted box J, of the gage-screws $h$ $h'$, as shown and described, and for the purpose specified.

5. In a key seating or slotting machine, the combination, with the cutter F, of the lever L, pivoted to the cross-bar K, said lever being provided with a thin edge, which extends down back of the cutter, the whole arranged as described, so that the operator, bearing upon the lever, can exert pressure upon the cutter, as herein set forth.

In witness whereof I have hereunto signed my name in the presence of two subscribing witnesses.

WILLIAM W. TREVOR.

Witnesses:
JAMES F. FITTS,
ALFRED HOLMES.